United States Patent
Lin et al.

(10) Patent No.: US 9,417,358 B2
(45) Date of Patent: Aug. 16, 2016

(54) MULTI-INFORMATION COUPLING PREDICTION METHOD OF COAL AND GAS OUTBURST DANGER

(75) Inventors: Baiquan Lin, Jiangsu (CN); Wei Yang, Jiangsu (CN); Cheng Zhai, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 436 days.

(21) Appl. No.: 14/007,380

(22) PCT Filed: Mar. 28, 2012

(86) PCT No.: PCT/CN2012/073190
§ 371 (c)(1),
(2), (4) Date: Sep. 25, 2013

(87) PCT Pub. No.: WO2012/130138
PCT Pub. Date: Oct. 4, 2012

(65) Prior Publication Data
US 2014/0019047 A1 Jan. 16, 2014

(30) Foreign Application Priority Data
Mar. 30, 2011 (CN) .......................... 2011 1 0077478

(51) Int. Cl.
*E21F 17/18* (2006.01)
*G01V 11/00* (2006.01)
*E21B 49/00* (2006.01)
*E21C 41/18* (2006.01)

(52) U.S. Cl.
CPC ............ *G01V 11/002* (2013.01); *E21B 49/005* (2013.01); *E21B 49/006* (2013.01); *E21C 41/18* (2013.01); *E21F 17/18* (2013.01)

(58) Field of Classification Search
CPC ....................................................... E21F 17/18
USPC .............................................................. 702/2
See application file for complete search history.

(56) References Cited

FOREIGN PATENT DOCUMENTS

| CN | 101550841 A | 10/2009 |
|----|----|----|
| CN | 101598033 A | 12/2009 |
| CN | 101806229 A | 8/2010 |
| CN | 101858228 A | 10/2010 |
| CN | 102242642 A | 11/2011 |
| RU | 2 019 706 C1 | 9/1994 |
| RU | 2 231 649 C1 | 6/2004 |

OTHER PUBLICATIONS

International Search Report for PCT/CN2012/073190 mailed May 24, 2012.

*Primary Examiner* — Bryan Bui
(74) *Attorney, Agent, or Firm* — RatnerPrestia

(57) ABSTRACT

Disclosed in the invention is a multi-information coupling prediction method of coal and gas outburst danger, which is achieved by establishing a multi-index coupling prediction model to detect indexes including original gas pressure of a coal layer, the original rock stress, the critical burst gas pressure of a coal sample, the mechanical performance of coal body, the exploit influence, the drilling cutting gas desorption index, the drilling cutting quantity index and the like, therefore to coupling predict the coal and gas outburst danger. By the multi-information coupling prediction method, the information of the coal and gas outburst danger can be fully complemented; the gas and crustal stress outburst danger prediction is carried out; the defects of insufficient complementation information of a single-index and inaccurate prediction are overcome; and the accuracy of the coal and gas outburst danger prediction is improved.

2 Claims, 1 Drawing Sheet

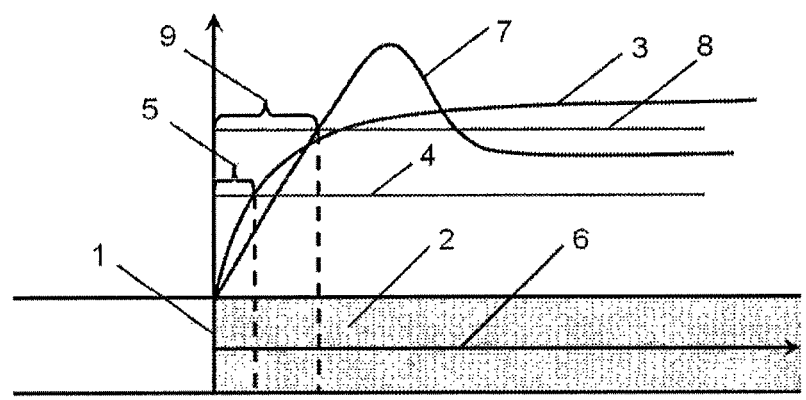

MULTI-INFORMATION COUPLING PREDICTION METHOD OF COAL AND GAS OUTBURST DANGER

CROSS REFERENCE TO RELATED APPLICATIONS

This application is the U.S. National Phase Application of PCT/CN2012/073190, filed Mar. 28, 2012, which claims priority to Chinese Patent Application No. 201110077478.0, filed Mar. 30, 2011, the contents of such applications being incorporated by reference herein.

FIELD OF THE INVENTION

The present invention relates to a method for prediction of gas outburst danger, in particular to a multi-information coupling prediction method for coal and gas outburst danger applicable to mining faces in coal mines.

BACKGROUND OF THE INVENTION

Coal and gas outburst hazard is one of the major hazards that cause massive injuries and deaths in mines. Accurately predicting the coal and gas outburst danger can effectively prevent accidents. At present, most coal and gas outburst danger prediction methods are single-index methods, which utilize a single index such as the amount of drill cuttings S, gas desorption index $K_1$ or $\Delta h_2$ of drill cuttings, initial rate of gas emission q from drill hole, etc., or utilizes an empirical formula summarized from these indexes to carry out prediction. Owing to the complex geological conditions of coal mines, these indexes cannot reflect the coal and gas outburst danger comprehensively; in addition, these indexes cannot achieve true coupling prediction. Therefore, they cannot be used to predict coal and gas outburst danger accurately, and under-estimated coal and gas outburst accidents often occur, causing great obstacles to the safe production in coal mines. Researches indicate that the loose and soft coal body attains adsorption equilibrium at specific gas pressure; when the gas pressure reduces suddenly, the adsorption equilibrium may be destroyed; therefore, the coal and gas outburst danger can be predicted by means of the critical rupture gas pressure of coal body, and coupling prediction can be performed with original gas pressure of coal seam, impact of coal mining, and gas desorption index of drill cutting, so as to improve the accuracy of prediction.

SUMMARY OF THE INVENTION

Technical problem: An aspect of the present invention provides a gas-based multi-information coupling prediction method for coal and gas outburst danger, which couples original gas pressure of coal seam, critical rupture gas pressure of coal sample, impact of coal mining, and gas desorption index of drill cutting so as to comprehensively collect coal and gas outburst danger information and obtain a prediction result that is more accurate.

Technical scheme: The multi-information coupling prediction method for coal and gas outburst danger disclosed in the present invention comprises:

a. testing the original gas pressure P of the coal seams in the mining zone and the maximum concentrated ground stress $\sigma_{max}$ in the coal body in front of the mining face, and testing the critical rupture gas pressure and critical compression strength of coal samples obtained on site;

b. drilling a hole in length not less than 10 m into the coal body in front of the mining face in the mining direction, measuring the gas desorption index of drill cutting once every 1 m drilling length, and recording the desorption index $K_1$ at 1 m, desorption index $K_2$ at 2 m, desorption index $K_3$ at 3 m, . . . , respectively, until the desorption index has stabilized, and taking the stabilized desorption index as the maximum desorption index $K_{max}$; measuring the total amount of drill cuttings within every 1 m drilling segment, recording the total amount of drill cuttings $S_1$ within the 1 m segment, total amount of drill cutting $S_2$ within the 2 m segment, total amount of drill cutting $S_3$ within the 3 m segment, . . . , respectively, and taking the highest value among the total amounts of drill cutting as the maximum amount of drill cutting $S_{max}$;

c. calculating the gas pressure $P_1$ at 1 m, gas pressure $P_2$ at 2 m, gas pressure $P_3$ at 3 m, . . . , with formula $$\frac{P_1}{K_1} = \frac{P_2}{K_2} = \frac{P_3}{K_3} = \frac{P_4}{K_4} = \ldots = \frac{P}{K_{max}};$$

calculating the ground stress $\sigma_1$ within the 1 m segment, ground stress $\sigma_2$ within the 2 m segment, ground stress $\sigma_3$ within the 3 m segment, . . . , with formula $$\frac{\sigma_1}{S_1} = \frac{\sigma_2}{S_2} = \frac{\sigma_3}{S_3} = \frac{\sigma_4}{S_4} = \ldots = \frac{\sigma_{max}}{S_{max}};$$

d. plotting a curve of gas pressure distribution in the coal body in front of the mining face and a straight line of critical gas pressure of coal body rupture by means of a multi-information coupling predictor for coal and gas outburst danger or plotting them manually, with the gas pressure values and ground stress values obtained at different positions, wherein, the distance from the mining face to the intersection point between the gas pressure distribution curve and the straight line of the critical gas pressure of coal body rupture is the gas-based critical drilling depth; plotting a curve of ground stress distribution in the coal body in front of the mining face and a straight line of critical compression strength of the coal body, wherein, the distance from the mining face to the first intersection point between the ground stress distribution curve and the straight line of critical compression strength near the mining face is the ground stress-based critical drilling depth; taking the smaller one in the gas-based critical drilling depth and the ground stress-based critical drilling depth as the critical drilling depth;

if the drilling depth in one operation in the tunnel is smaller than the critical drilling depth, predicting that the result is "safe"; if the drilling depth is greater than or equal to the critical drilling depth, predicting that the result is "dangerous"; thereby accomplishing the ground stress-based multi-information coupling prediction of coal and gas outburst danger.

Beneficial effects: with the technical scheme described above, coupling prediction is performed with multiple factors, including original gas pressure in the coal seams, ground stress in primary rocks, critical gas pressure of coal sample rupture, mechanical strength of coal body, impact of coal mining, gas desorption index of drill cutting, and amount of drill cutting, so as to overcome the drawbacks of incomplete information collection and inaccurate prediction in single-factor prediction methods and improve prediction accuracy.

The method can accomplish gas-based and ground stress-based prediction of coal and gas outburst danger, and is applicable to soft coal and hard coal; by multi-information coupling prediction, the information for prediction of coal and gas outburst danger is richer, and therefore the prediction result is more accurate. Thus, the method disclosed in the present invention can provide important guarantee for safe production in coal mines. In addition, the parameters such as original gas pressure in coal seams, critical gas pressure of coal sample rupture, stress in primary rocks, and mechanical strength of coal body are tested at the beginning; only the routine prediction indexes (e.g., amount of drill cutting, drill cutting desorption index $K_1$ or $\Delta h_2$, etc.) have to be tested in the routine prediction process to accomplish multi-information coupling prediction; the prediction process is simple and convenient, and the prediction accuracy is high.

BRIEF DESCRIPTION OF THE DRAWINGS

FIG. 1 is a schematic diagram of the multi-information coupling prediction method for coal and gas outburst danger disclosed in the present invention; wherein,
1—mining face in tunnel; 2—coal body; 3—gas pressure distribution curve; 4—straight line of critical gas pressure rupture; 5—gas-based critical drilling depth; 6—drill hole; 7—ground stress distribution curve; 8—straight line of critical compression strength; 9—ground stress-based critical drilling depth.

DETAILED DESCRIPTION OF THE EMBODIMENTS

As shown in FIG. 1, in the multi-information coupling prediction method for coal and gas outburst danger according to the present invention, the gas pressure in the coal seams in the mining zone is tested multiple times, and the maximum value among the obtained values in the tests is taken as the original gas pressure P in the coal seams; in addition, the maximum concentrated ground stress $\sigma_{max}$ in the coal body 2 is tested via a hydraulic pressure rupture method, stress relaxation method (e.g., for hollow buds), or other methods that can detect ground stress; moreover, coal samples are taken in the mining zone, and the critical rupture pressure of the coal samples and critical compression strength of the coal samples are tested. A drill hole 6 with length not less than 10 m in the working direction is drilled in the coal body 2 in front of the mining face in the tunnel, and the gas desorption index of drill cutting or other indexes that can reflect gas pressure or amount is measured in every 1 m drilling length; recording the desorption index $K_1$ at 1 m drilling length, desorption index $K_2$ at 2 m drilling length, desorption index $K_3$ at 3 m drilling length, . . . , respectively, till the desorption index has stabilized; in the testing process, the gas desorption index can be measured once every 2 m drilling length if the change is not high; taking the stabilized desorption index as the maximum desorption index $K_{max}$; in addition, measuring the total amount of drill cutting or other indexes that can reflect the change of ground stress within every 1 m segment, and recording the amount of drill cutting $S_1$ within the 1 m segment, amount of drill cutting $S_2$ within the 2 m segment, amount of drill cutting $S_3$ within the 3 m segment, . . . , respectively, and taking the maximum value among the recorded amounts of drill cutting as the maximum amount of drill cutting $S_{max}$. If the maximum desorption index $K_{max}$ or maximum amount of drill cutting $S_{max}$ exceed the critical values specified in the "Regulation on Prevention and Control of Coal and Gas Outburst", it indicates that the outburst danger exists; if there is no outburst danger, continue the prediction as follows. Owing to the fact that the gas desorption index of drill cutting increases as the gas pressure increases and decreases as the gas pressure decreases, there is a mapping relation between the gas desorption index of drill cutting and gas pressure, which is to say, the maximum gas desorption index $K_{max}$ of drill cutting corresponds to the maximum original gas pressure P of the coal seams; then, with the following formula:

$$\frac{P_1}{K_1} = \frac{P_2}{K_2} = \frac{P_3}{K_3} = \frac{P_4}{K_4} = \ldots = \frac{P}{K_{max}},$$

calculating the gas pressure $P_1$ at 1 m drilling length, gas pressure $P_2$ at 2 m drilling length, and gas pressure $P_3$ at 3 m drilling length, . . . . Owing to the fact that the amount of drill cutting reflects the magnitude of ground stress (the amount of drill cutting increases as the ground stress increases, and decreases as the ground stress decreases), and the maximum amount of drill cutting $S_{max}$ corresponds to the maximum ground stress $\sigma_{max}$, with the following formula:

$$\frac{\sigma_1}{S_1} = \frac{\sigma_2}{S_2} = \frac{\sigma_3}{S_3} = \frac{\sigma_4}{S_4} = \ldots = \frac{\sigma_{max}}{S_{max}},$$

calculating the ground stress $\sigma_1$ at 1 m drilling length, ground stress $\sigma_2$ at 2 m drilling length, and ground stress $\sigma_3$ at 3 m drilling length, . . . . Plot a curve of gas pressure distribution 3 in the coal body 2 in front of the mining face 1 in the tunnel and a straight line of critical gas pressure of coal body rupture 4 by a multi-information coupling predictor for coal and gas outburst danger or plot them manually, with the obtained gas pressure values and ground stress values at different positions, wherein, the distance from the mining face 1 to the intersection point between the curve of gas pressure distribution 3 and the straight line of critical gas pressure rupture 4 is the gas-based critical drilling depth 5; in addition, plot a curve of ground stress distribution 7 in the coal body 2 in front of the mining face 1 and a straight line of critical compression strength 8 of the coal body 2, wherein, the distance from the mining face 1 to the first intersection point between the curve of ground stress distribution 7 and the straight line 8 of critical compression strength near the mining face 1 is the ground stress-based critical drilling depth 9; take the smaller one in the gas-based critical drilling depth 5 and ground stress-based critical drilling depth 9 as the critical drilling depth;

If the drilling length in one operation in the tunnel is smaller than the critical drilling length, predict that the result is "safe"; if the drilling length is greater than or equal to the critical drilling length, predict that the result is "dangerous", thereby the ground stress-based multi-information coupling prediction of coal and gas outburst danger is completed. Since coupling prediction is carried out with multiple factors, including original gas pressure in the coal seams, ground stress in primary rocks, critical gas pressure of coal sample rupture, mechanical strength of coal body, impact of coal mining, gas desorption index of drill cutting, and amount of drill cuttings, etc., in the prediction process, richer information on coal and gas outburst danger is utilized and gas-based and ground stress-based outburst danger prediction can be performed, and therefore the accuracy of coal and gas outburst danger prediction can be improved.

The invention claimed is:

1. A multi-information coupling prediction method for coal and gas outburst danger, comprising:
   a. testing an original gas pressure repeatedly in the coal seams in a mining zone and the maximum value is determined as P and the maximum concentrated ground stress $\sigma_{max}$ in a coal body in front of the mining face is tested via a hydraulic pressure rupture method, stress relaxation method or other methods that can detect ground stress, and testing the critical gas pressure rupture and critical compression strength of coal samples obtained on site;
   b. drilling a hole in length not less than 10 m into the coal body in front of the mining face in the mining direction, measuring a gas desorption index of drill cutting once every 1 m drilling length, and recording a desorption index $K_1$ at 1 m, a desorption index $K_2$ at 2 m, a desorption index $K_3$ at 3 m, ..., respectively, until the desorption index has stabilized, and taking the stabilized desorption index as a maximum desorption index $K_{max}$; measuring a total amount of drill cutting within every 1 m drilling segment, recording a total amount of drill cutting $S_1$ within the 1 m segment, total amount of drill cutting $S_2$ within the 2 m segment, total amount of drill cutting $S_3$ within the 3 m segment, ..., respectively, and taking a highest value among the total amounts of drill cutting as the maximum amount of drill cutting $S_{max}$;
   c. owing to the fact that the gas desorption index of drill cutting increases as the gas pressure increases and decreases as the gas pressure decreases, there is a mapping relation between the gas desorption index of drill cutting and gas pressure, the maximum gas desorption index $K_{max}$ of drill cutting corresponds to the maximum original gas pressure P of the coal seams; then, calculating a gas pressure $P_1$ at 1 m, a gas pressure $P_2$ at 2 m, a gas pressure $P_3$ at 3 m, ..., with formula $$\frac{P_1}{K_1} = \frac{P_2}{K_2} = \frac{P_3}{K_3} = \frac{P_4}{K_4} = \ldots = \frac{P}{K_{max}};$$

owing to the fact that the amount of drill cutting reflects the magnitude of ground stress, the amount of drill cutting increases as the ground stress increases, and decreases as the ground stress decreases, and the maximum amount of drill cutting $S_{max}$ corresponds to the maximum ground stress $\sigma_{max}$; calculating a ground stress $\sigma 1$ within the 1 m segment, a ground stress $\sigma 2$ within the 2 m segment, ground stress $\sigma 3$ within the 3 m segment, ..., respectively, with formula $$\frac{\sigma_1}{S_1} = \frac{\sigma_2}{S_2} = \frac{\sigma_3}{S_3} = \frac{\sigma_4}{S_4} = \ldots = \frac{\sigma_{max}}{S_{max}};$$

d. plotting a curve of gas pressure distribution in the coal body in front of the drilling face in the tunnel and a straight line of critical gas pressure of coal body rupture by a multi-information coupling predictor for coal and gas outburst danger or plotting them manually, with the obtained gas pressure values and ground stress values at different positions, wherein, the distance from the mining face to the intersection point between the curve of gas pressure distribution and the straight line of critical gas pressure rupture is the gas-based critical drilling depth; in addition, plotting a curve of ground stress distribution in the coal body in front of the mining face and a straight line of critical compression strength of the coal body, wherein, the distance from the mining face to the first intersection point between the curve of ground stress distribution and the straight line of critical compression strength near the mining face is the ground stress-based critical drilling depth; taking the smaller one in the gas-based critical drilling depth and ground stress-based critical drilling depth as the critical drilling depth;
   if the drilling depth in one operation in the tunnel is smaller than the critical drilling depth, predicting that the result is "safe"; if the drilling depth is greater than or equal to the critical drilling depth, predicting that the result is "dangerous"; thereby accomplishing the ground stress-based multi-information coupling prediction of coal and gas outburst danger.

2. A multi-information coupling prediction method for coal and gas outburst danger according to claim 1, wherein, in the testing process, the gas desorption index of drill cutting can be measured once every 2 m drilling length if the change of gas desorption index is not high.

* * * * *